3,194,634
PROCESS FOR PRODUCING SILICA IN THE FORM OF A DISPERSED POWDER
Georges Yelnik, Saint-Jean-de-Maurienne, and Robert Odievre, Riouperoux, France, assignors to Solumeta, Paris, France, a corporation of France
Filed Feb. 27, 1961, Ser. No. 92,072
Claims priority, application France, Feb. 26, 1960, 819,720, Patent 1,257,842
3 Claims. (Cl. 23—182)

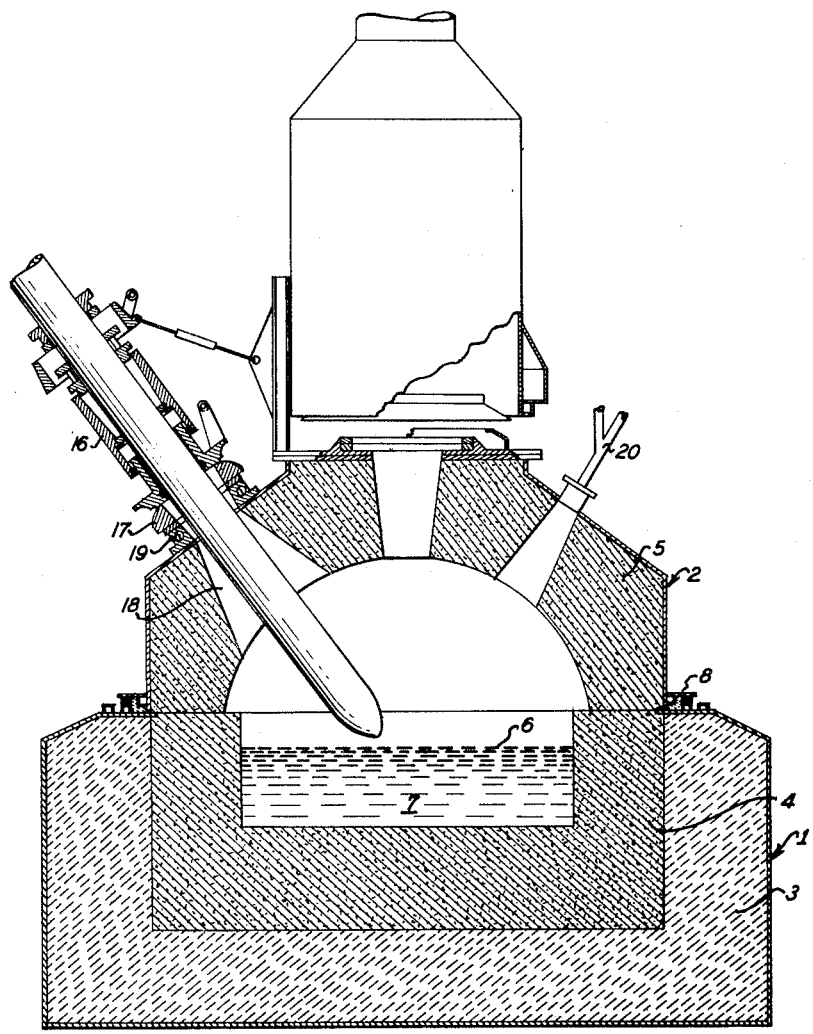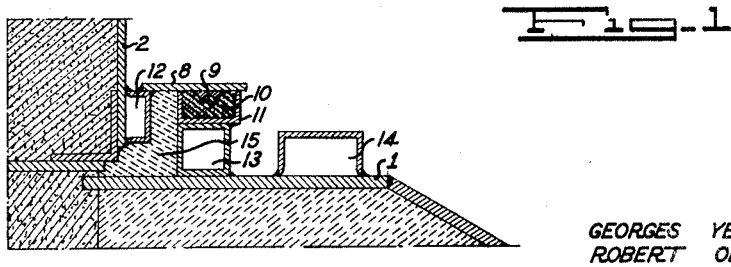

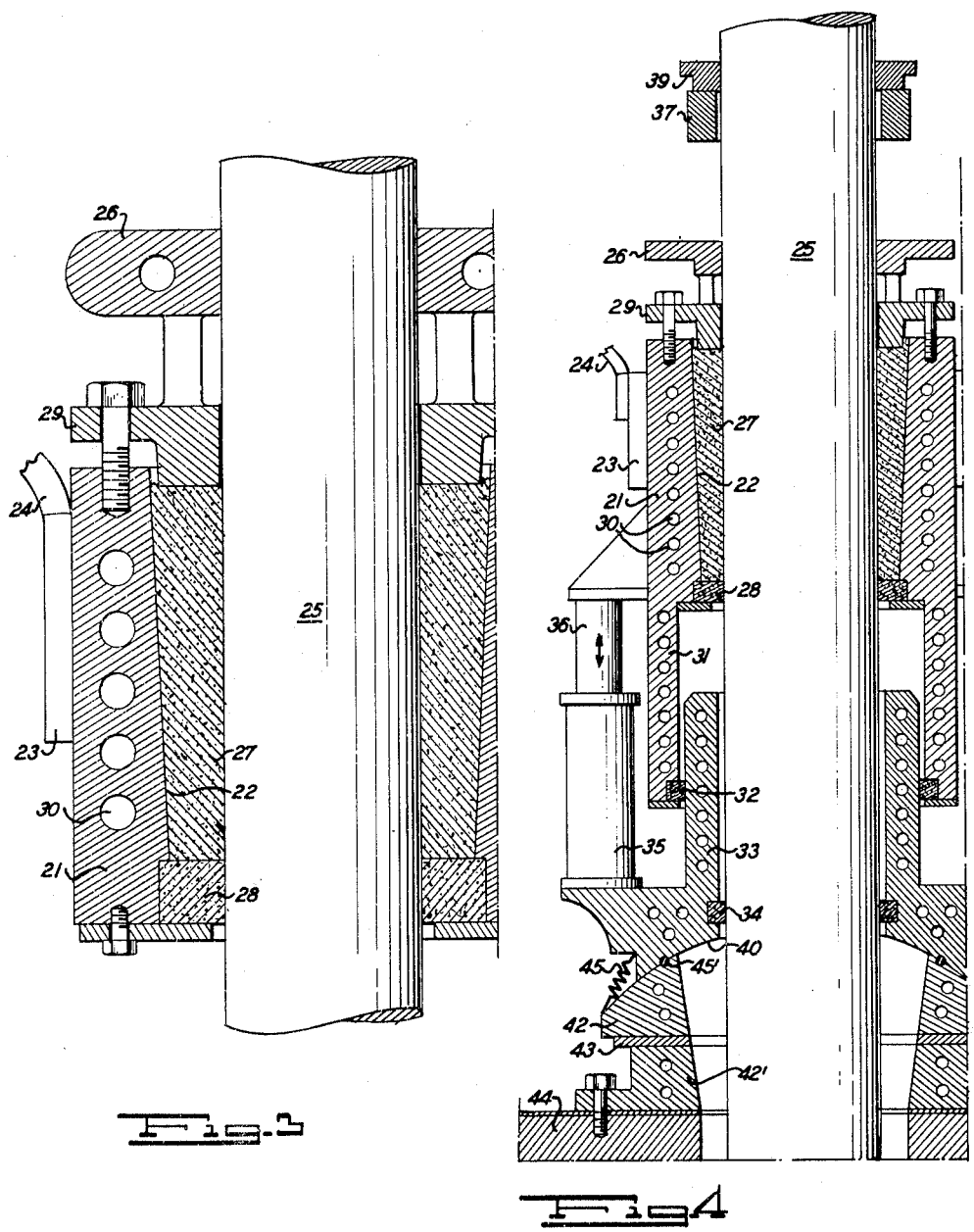

The present invention, which results from applicants' researches, relates to a process and apparatus for producing oxides in the state of dispersed powders. It can be applied to the preparation of all sorts of substances in a very finely divided state and is particularly important in the case where it is desired to prepare dispersed silica.

It is known that dispersed products can be obtained by vaporizing in an arc furnace oxidized minerals partially reduced by carbon, the gas thus obtained being subsequently treated in a second space (enclosure) where it is burned and cooled giving rise to an oxidized powder. Such a process has been described in U.S. Patent 2,862,792 issued to the Societe Solumeta.

The present process and the related apparatus concern more particularly the first stage of the above operation, that is to say, the production in a sealed furnace of suboxides of metals or of metalloids (e.g. silicon monoxide) in the form of vapor. The invention makes it possible to obtain products of better quality than those of the prior art and, at the same time, a more certain and uniform operation of the production plant.

In what follows there will be mentioned more particularly the application of the process to the manufacture of dispersed silica; however, the invention is not at all limited to this substance and, on the contrary, comprehends all those the oxides of which must be formed in the state of dispersed powders such as, and without limitation, oxides of aluminum, lead, zinc, etc.

A particular form of the process applied to the production of dispersed silica consists in operating in the hearth of the furnace, at temperatures of the order of 2000 to 2600° and, preferably, at 2400° C., the partial reduction and volatilization of the starting (raw) materials (mixture of silicon dioxide and carbon) in the presence of a metallic bath having a silicon base, the said bath being of sufficient depth and volume relative to the volume of the introduced starting material to impart a good electric conductivity to the charge, to create an effective thermal storage (inertia) and to absorb an appreciable proportion of the impurities contained in the starting materials.

Satisfactory results are obtained by providing a depth of metallic bath of the order of about 30 to 40 centimeters.

According to the novel process, the furnace is charged continuouslyy with a mixture of sand and coke in such a way that the formed superficial layer will be permanently of a volume which is 5 to 20 times smaller than the volume of the silicon bath and, preferably, of the order of 8 to 12 times smaller.

According to another special feature of the process, the intensity of the vaporization is related (adjusted, coordinated) to the quantity of heat developed by the oxidation of the dispersed powders by measuring, by means of a thermoelectric couple, the temperature of the hot gases at the top of the hood above the furnace, the direct measurement of the temperature of the bath hardly being practical.

Applicants have established that the most intense vaporization is obtained when the superficial layer of slight thickness (of the order of about 2 to 5 centimeters) is constituted of molten silica of the sand-coke mixture and that it presents, moreover, at the surface a few lumps or drops of the silicon metal extending through the superficial layer from the bath.

Hence the process makes it possible to adjust the composition of the bath with a view to optimum production by regulating the feed as a function of the temperature of the gases and the appearance of the surface of the bath.

Thus, if the temperature of the gases drops at the same time that the lumps of metal disappear beneath a too thick layer of silica, the percentage of coke is increased. If, on the contrary, the superficial layer of molten silica disappears, the percentage of sand is increased.

In addition, other variables make it possible to detect a change in the composition of the bath, for example, an increase in the intensity of current passing through each electrode (as a result of the variation in the conductivity of the bath), change in appearance of the flame, and change in noise of the arc.

The uniform operation of the plant in which the new process is carried out is still more improved when special precautions are taken with a view to the operation of the (sealed) closed furnace at constant power.

Thus, according to a particular embodiment of the invention, means are provided not only for maintaining approximately constant, and of the order of 2 to 5 centimeters, the distance between the electrode and the bath, but also for maintaining appreciably constant and of the order of 15 to 30 centimeters the distances between the tips of the electrodes.

According to the novel process, there are also provided means for suppressing the initiation of an arc between the electrode and the roof of the sealed (closed) furnace, initiations which have a tendency to be produced by the accumulation of crusts or deposits of conducting material inside the sleeve provided in the thickness of the roof, for the passage of the electrode. As means of preventing the formation of harmful deposits, there is advantageously used a continuous or intermittent cleaning, by means of an inert gas under pressure, of those zones where the said deposits are selectively formed.

Within the scope of the invention, there can also be provided means for cleaning by blowing inert gases in zones of the plant other than those of the electrodes, for example, in the supply ducts for the sand-coke mixture where harmful deposits may form.

The invention also comprehends arrangements and certain details of apparatus for carrying out the process. A preferred but non-limiting embodiment of one of these arrangements is given, by way of example only, in the following description and in the annexed drawings in which FIGURE 1 shows in section an electric furnace and a hood where the gases are burned;

FIGURE 2 is a section which shows in detail the assembly of the roof on the furnace tank;

FIGURE 3 illustrates in section an arrangement for the current inlet to the electrode according to the invention, while FIGURE 4 shows in section an embodiment of a sealed electrode holder with variable inclination.

As will be seen from FIGURE 1, the first chamber where the reaction takes place is a closed (sealed) furnace constituted of a tank 1 and a roof 2 made of sheet steel lined with refractory material 3. The hearth 4 is constituted of amorphous carbon or of graphite; the roof 2 is completely lined with carbon 5 in a substantially spherical shape, the center of said sphere being in the neighborhood of the plane 6 of the average level of the bath 7.

The sheet of the roof is cooled by means of water cooled chambers, this arrangement reducing the wear of the lining since the carbon hardly reacts at all when it is cooled in this fashion.

The gases from the furnace are exhausted by a fan (not illustrated) of the device for retaining the powders as is known in the art. The furnace is maintained under sub-atmospheric pressure and means are provided for maintaining the furnace sealed.

Thus, in the embodiment shown in FIGURE 1 and in more detail in FIGURE 2, there has been applied in a sealed manner under the periphery of the roof a ring 8 which supports a round iron ring 9 which compresses a foam rubber joint 10 placed in a channel 11 integral with the tank 1. Water circulating chambers 12, 13 and 14 are provided on the tank and on the roof for cooling the sealed joint 9, 10 which, moreover, is protected by a refractory material 15 packed in the interval (space) between the tank and the roof.

The electrode holders 16 mounted on the furnace are of the sealed type; they are fixed on the conical part of the roof 2 and are insulated from the latter by double insulation.

Such an electrode holder is described further on but is not claimed herein as it forms the subject of and is claimed in a separate application filed February 16, 1961, by Joseph Souchet now matured into U.S. Patent No. 3,122,600, and which is assigned to the same assignee as the present invention.

Control of the distance of the tips of the electrodes from the bath and of the tips of the electrodes between each other is carried out by longitudinal displacement of the electrodes and by pivotal motion of the electrode on the sector-shaped supports 17. The inclination of the electrode is, preferably, comprised between about 40 and 60°.

The electrodes pass the carbon roof 5 through conical sleeves 18 having such a conicity, that the largest radial distance between the surface of the electrode and the interior wall of the sleeve is at least equal to the spacing between the electrode tips.

Deposits of conductive material, which produce the risk of starting arcs between electrode and roof, mostly tend to form on the cooled portions, that is to say, on the base of the electrode holder. According to the invention there is provided at 19 a hollow ring concentric with the electrode and comprising two concentric compartments; in one of these there circulates cooling water, while the second, placed towards the electrode, receives through radial holes an inert or reducing gas under pressure which sweeps the periphery of the electrode. By way of example, it can be mentioned that an effective cleaning of the electrodes 300 millimeters in diameter, mounted in a furnace of 2500 kw. was obtained by forcing nitrogen under a pressure of 4 kilograms per square centimeter for 20 seconds every half hour.

Charging of the furnace with a mixture of sand-coke is carried out continuously through tubes 20 of welded refractory steel, cooled by water circulation and placed between the electrodes. A cleaning system by intermittent or continuous blowing of nitrogen at the inlet of said tube, avoids formation of crusts or deposits which entails the risk of preventing charging of the furnace. There is advantageously selected a device comprising a hollow crown identical to that used for cleaning the base of the electrode holders.

The inclination of the charging tubes is selected in such a manner that, in a 3-phase furnace, the striking (impact) point of the mixture introduced into the furnace is situated approximately in the center of the sides of the equilateral triangle formed by the three tips of the electrode.

By a judicious placement of the conductors which bring in the 3-phase current to the electrodes, there is obtained, by a device according to the invention, an electromagnetic mixing of the bath which improves the homogeneity of the latter.

In the case of the preparation of dispersed silica, more particularly mentioned above, the metallic portion of the bath becomes charged with impurities, particularly of iron, derived from the starting material. At the end of a certain operating period, the bath which has become too rich in iron must be renewed, in part or in whole, for example, by tapping the portion of the bath rich in ferrosilicon, or by removing the said bath during stopping of the furnace.

According to a preferred embodiment of the present invention, the sealed electrode holder provided for the furnace comprises a gas tight arrangement, such as is described in the above-mentioned co-pending application filed on February 16, 1961, by Joseph Souchet, Serial No. 89,747 now matured into U.S. Patent No. 3,122,600, for leading in electric current to the electrode, in which a divided substance which conducts electric current and which is heat resistant, more particularly one that has a carbon base, is maintained in close contact with said electrode through compression by means of a stuffing-box. This electrode holder is characterized in that it comprises, in combination, a system of jacks which is integral both with the furnace roof and with this current inlet system, as well as a clamping system for the electrode comprising, on the one hand, clamping means which are integral with the current inlet system and, on the other hand, clamping means independent of this device, so that the said system of jacks makes it possible to carry out the longitudinal displacement of the electrodes which has been made integral with the current inlet device and fixed relatively to the latter, or the longitudinal displacement of this current inlet system relative to the electrode which is maintained fixed in space.

Moreover, this electrode holder comprises likewise in combination, means for inclining the said electrode constituted of a cylindrical supporting surface integral with said jack system, and resting against a corresponding surface of a base which is integral with the furnace roof and fixed relatively to the latter.

In a preferred but non-limiting embodiment of the invention, the electrode holder is provided with a tubular metallic part or sleeve, concentric with the electrode and having a diameter larger than the electrode diameter, and the annular space between these two parts is provided with a divided material, means being provided for maintaining the said material in a compressed state.

According to the invention, uniform contact is established over the entire periphery of the electrode, thus precluding formation of hot points or burned areas.

According to the operating intensity of the electrode, the sleeve is made of a more or less greater length and the density of the current is maintained between the usual limits by increasing the contact surface between the conductive powdered material and the electrode.

As divided conductive material, there is advantageously used graphite in the form of powder and/or flakes. Good results are obtained by using a mixture of these two products, a better conductivity being obtained by employing a mixture containing approximately equal parts of powder and flakes.

There can also be used for the conducting joint, in whole or in part, carbides of refractory metals such as, and without limitation, carbides of tungsten, of molybdenum, of tantalum, of titanium, of zirconium, etc.

In a preferred embodiment of the invention, the sleeve is provided at its lower end with one or more packing rings to avoid the loss of graphite, a loss which can be produced by entrainment during the displacements of the electrode relatively to the sleeve.

Means are provided for pressing the graphite, at least when the electrodes are under current, both against the electrodes and against the current inlet sleeve. Thus, in an embodiment which has given good results, the upper part of the sleeve comprises a screw-type stuffing-box which compresses the graphite in the annular space provided therefor.

A still better contact is secured when the interior surface of the sleeve is given a slightly truncated profile, the small base being directed towards the tip of the electrode. There is then produced a wedging effect which enhances packing of the graphite.

The novel arrangement according to the invention presents the advantage of producing not only an excellent "electric joint", but also a joint which is sealed against gases between the electrode and the part where the current is introduced, the said joint nevertheless permitting relative displacements between the electrode and the part where the current is introduced.

The novel electrode holder is, as the result of this fact, especially advantageous when it is used in the case of electric furnaces wherein the atmosphere of the hearth must be different in pressure and/or composition, from the external atmosphere.

In a preferred but non-limiting embodiment of the invention, there are provided secondary means for clamping the electrode, the said secondary means merely having the function of mechanically clamping the electrode and being integral with the current inlet sleeve.

Moreover, longitudinal translation means are provided, as is usual, for the electrode to insure control, the said means acting, preferably, on the sleeve or on the said secondary clamping means of the electrode.

Moreover, according to the invention there is obtained a sealed (tight) electrode holder by providing, between the parts of the electrode holder subjected to relative longitudinal displacement, tight, sliding (expansion) joints composed of a material which is heat resistant.

The present invention finds a particularly important application in the case where it is desired to obtain a sealed electrode holder, having a variable inclination, an arrangement which makes it possible to obtain optimum spacing between the electrodes of the same furnace, in spite of variations in depth of the bath therein.

The stationary portion in the electrode holder space comprises a fixed sector shaped base, for example, on the roof furnace, and on which there is mounted a part or electrode guide having a surface complementary to that of the sector shaped base.

There is described below, by way of non-limiting example, certain preferred embodiments of portions of the invention discussed above. Referring more particularly to FIGURES 3 and 4:

As shown on FIGURE 3, the interior surface 22 of the sleeve 21 of the electrode holder is slightly truncated. The electric current is led into said sleeve, for example, by means of a lug (socket, thimble) 23 connected to the cables 24. The sleeve 21 is supported on the one hand by any convenient means on a stationary part of the system such as a cross member, furnace roof, etc. not shown on the figure, through the intermediary of any suitable longitudinal translation means such as a jack, a pulley block, enabling control of the elevation of the electrodes.

The electrode 25 is clamped in a clamping ring 26 integral with the sleeve 21, or with a part which is itself integral with the said sleeve.

The space 27 between the electrode and the internal face 22 of the sleeve is provided with a mixture of graphite flakes and powder which is retained at the bottom by one or more graphite rings 28 and packed by means of a stuffing-box 29.

When the electrode holder is intended for a large diameter electrode, there are advantageously provided supplementary guiding rings for the electrode, in order that the electrode not be forced on the graphite ring 28.

The said ring 28 has for its object to retain the powder-flake graphite mixture while enabling sliding of the electrode, hence, its diameter must be calibrated with precision. In the case where the electrode diameter tolerances are appreciable, it can be advantageous to superpose several slit graphite rings, taking the precaution that the slots are opposite to each other.

During operation of the furnace, a certain quantity of graphite powder may be entrained, particularly during the sliding operation of the electrode or during the passage of the connecting nipples; for this reason there is provided a (certain) guard for the stuffing-box 29 which can be periodically tightened when this becomes necessary.

Without departing from the scope of the invention, there can be arranged, namely, in the case of small diameter electrodes, to carry out the mechanical clamping of the electrode in the electrode holder solely by means of the conductive joint of graphite flakes, thereby eliminating the clamping ring. It can be advantageous to provide the stuffing-box with a remote control system, for example, using a jack, for rapidly releasing the clamping pressure on the flake joint, to facilitate sliding of the electrode.

On FIGURE 4 there is shown a particular embodiment of the present invention in which advantage is taken of the sealing effect produced between the current inlet sleeve 21 and the electrode 25 by reason of the presence of the conductive joint of graphite flakes.

FIGURE 4 shows a sealed and orientable electrode holder, which enables a very accurate regulation of the arc in furnaces working with a controlled atmosphere.

In this embodiment, the electric contact between the sleeve 21 cooled by the circulation of water in the tubes 30, and the electrode 25, is secured, as previously described, by means of graphite powder and flakes packed in the space 27 by means of the stuffing-box 29, while the mechanical clamping of the electrode on the electrode holder is completed by a clamping ring 26 integral with the sleeve 21.

The sleeve 21 is extended by a tubular skirt element, likewise cooled, comprising at its lower end a packing joint 32 inserted in a stuffing-box. The said joint is susceptible of sliding on the external surface of a tubular electrode guide 33 which is stationary during the translation motion and cooled by water circulation, and eventually comprising a ring 34, or a portion of a ring, for guiding or supporting the electrode when the latter is not vertical.

The control of the electrode in elevation is produced by any usual adjusting means such as that which has been represented by way of example in FIGURE 4, and comprising one or more jacks 35, the cylinders of which rest on a part of the electrode holder which remains stationary during translation, such as the tubular guide 33, and the pistons 36 of which acts on the sleeve 21 or on a part integral with the latter.

To enable sliding of the electrode as it is consumed, there is advantageously provided on the upper end of the electrode holder a guiding ring 37 which is made integral with the stationary part of the electrode holder (element 33) through the intermediary of cheeks, not shown in FIGURE 4.

When the pistons 36 of the jacks 35 arrive at the end of their stroke into their lower positions, there is clamped on the electrode a collar 39 which then rests on the stationary ring 37. The collar 26 is unclamped, and the electrode retained by the collar 39 remains stationary while the jacks are operated for raising the current inlet assembly.

The ring 26 is then reclamped and the collar 39 is loosened, to again permit operation of the electrode by means of the jacks 35.

According to a preferred but non-limiting embodiment, shown in FIGURE 4, the inclination of the electrode holder is made variable by providing, for the tubular electrode guide 33, a lower cylindrical supporting surface 40 which rests on a corresponding surface of the base 42–42′ comprising an insulated joint 43 and fixed, for example, to the furnace roof 44.

As will be understood, convenient means for clamping or pressing the cylindrical surfaces 40 and 42 against each other, prevent any accidental change in inclination of the electrode holder and of the flexible joint such as 45-45', thereby insuring total sealing of the pivoting device.

Any other embodiments, which comprise variants of those which have been more particularly described above, are, as is well understood, comprehended within the scope of the invention.

We claim:

1. In the process of producing silicon dioxide as a dispersed powder by (1) the partial reduction of silicon dioxide into silicon monoxide utilizing carbon as the reducing agent and the vaporization of silicon monoxide in an arc furnace containing electrodes, and (2) the combustion and cooling of the silicon oxide vapors in a separate zone, the improvement comprising treating a powdered mixture of silica and carbon by continuously charging same into a sealed arc furnace maintained at a temperature of about 2000–2600° C. and containing a molten bath consisting essentially of silicon, said mixture being charged such that the molten layer of said mixture on said bath is maintained at a volume 5 to 20 times smaller than the volume of the bath, whereby impurities contained in the charged mixture are absorbed by said bath, the silica reduced to silicon monoxide and vaporized, further comprising blasting the interior of said furnace with blasts of inert gases to inhibit formation of deposits of conducting material on said furnace, and thereafter burning and cooling the silicon monoxide gas to produce said silica power.

2. A process in accordance with claim 1 wherein said volume of said layer is 8–12 times smaller than the volume of said bath.

3. Process according to claim 1 wherein the distance between the electrodes and the bath is maintained at 2 to 5 cms. and the distance between the electrode tips is maintained constant and of the order of 15 to 30 cms., by imparting a longitudinal and pivotal motion to each electrode.

References Cited by the Examiner

UNITED STATES PATENTS

| | | | |
|---|---|---|---|
| 886,636 | 5/08 | Potter | 23—182 |
| 2,573,057 | 10/51 | Porter. | |
| 2,653,078 | 9/53 | Lane | 23—139 |
| 2,670,272 | 2/54 | Nutting | 23—139 |
| 2,752,410 | 6/56 | Olsson | 13—9 |
| 2,807,600 | 9/57 | Newton | 23—182 X |
| 2,862,792 | 12/58 | Rehm. | |
| 2,863,738 | 12/58 | Van Antwerp. | |
| 2,959,630 | 11/60 | Reschke | 13—9 |

MAURICE A. BRINDISI, *Primary Examiner.*

MILTON O. HIRSHFIELD, *Examiner.*